Figure 1:
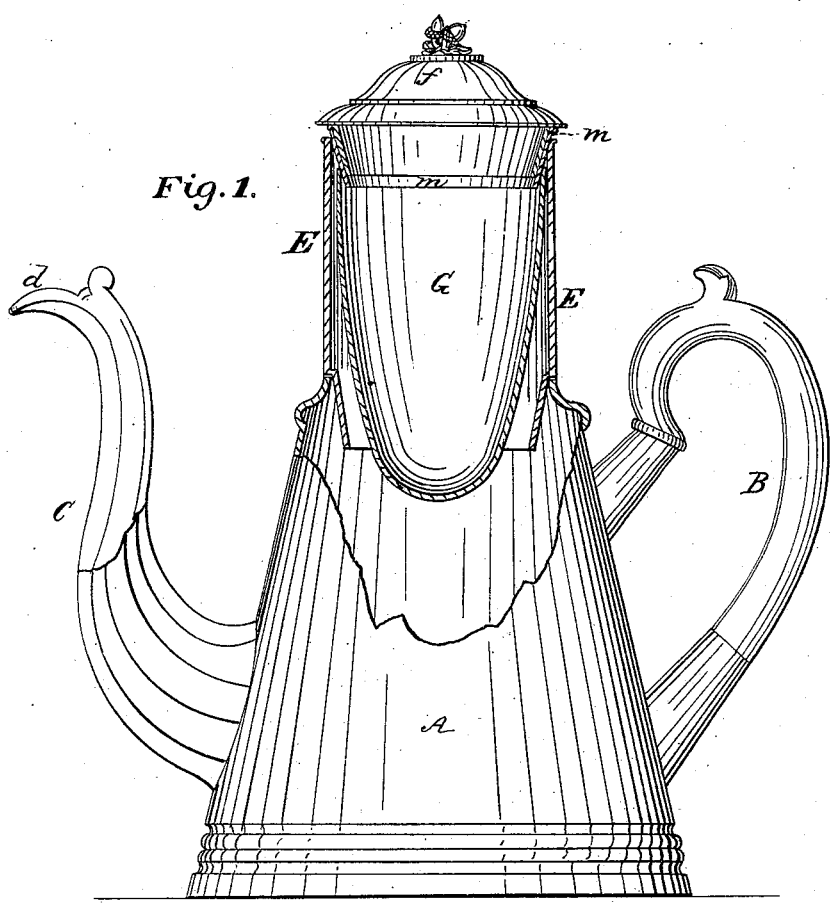

J. L. LABIAUX.
Coffee Pot.

No. 87,179.   Patented Feb. 23, 1869.

Witnesses:
Chas. A. Scott.
Frederic A. Sayer

Inventor:
J. L. Labiaux.
By his attorney
J. Mue Suture

United States Patent Office.

J. L. LABIAUX, OF NEWARK, NEW JERSEY.

Letters Patent No. 87,179, dated February 23, 1869.

IMPROVEMENT IN COFFEE-POTS

The Schedule referred to in these Letters Patent and making part of the same.

*To all whom it may concern:*

Be it known that I, J. L. LABIAUX, of Newark, of Essex county, in the State of New Jersey, have invented certain new and useful "Improvements in Coffee-Pots;" and I do hereby declare that the following is a full and exact description thereof, reference being had to the accompanying drawings, making part of this application.

My invention relates to that kind of coffee-pot known as the French coffee-pot, and in which the ground coffee is placed in a filter arranged in the upper part of the pot, and boiling water poured on to it, which percolates through the coffee and filter, and descends into the lower compartment of the pot, after the French fashion of making coffee.

Previous to my invention, this kind of coffee-pot had been made generally with a metallic filter, composed of perforated sheet-metal. But it has been found that the filter, if made very fine, (that is, with very minute perforations,) would clog up, and if made coarse, the coffee-grains (or grounds) would pass through with the water, spoiling the beverage.

And as it is known that the finer the coffee is ground, the greater the richness of the beverage produced by this system of making coffee, it has become a great desideratum to provide some means for filtering the water through the coffee, ground as fine as possible; and it has been suggested (and practised by some) to sew the quantum of finely-ground coffee up tight in a flannel bag, place it in the upper compartment of the pot, and pour the boiling water slowly on to the bag, allowing the water thus to percolate and filter through the coffee and flannel. But this method is too troublesome to be practised generally, though producing a better result than can be attained by the metallic filter.

My invention has for its object to provide a (French) coffee-pot, in which the beverage may be made by slowly filtering the boiling water through the mass of coffee, ground as fine as possible, so as to obtain the largest possible degree of strength and richness of flavor in the beverage, and at the same time have the latter free from all particles, or perfectly "clear," and the apparatus perfectly simple and economic of manufacture; and to these ends, My invention consists in providing the coffee-pot, (made in two parts, after the fashion of a French coffee-pot,) with a filtering-bag, or pocket, formed of woollen felt, as will be hereinafter more fully explained, into which the ground coffee is put, the boiling water being poured into it, and allowed to percolate through the coffee, and pass through the pores of the bag or pocket.

To enable those skilled in the art to make and use my invention, I will proceed to describe it more fully, referring by letters to the accompanying drawings, in which—

Figure 1 is a sectional elevation of one of my improved coffee-pots, and

Figure 2:
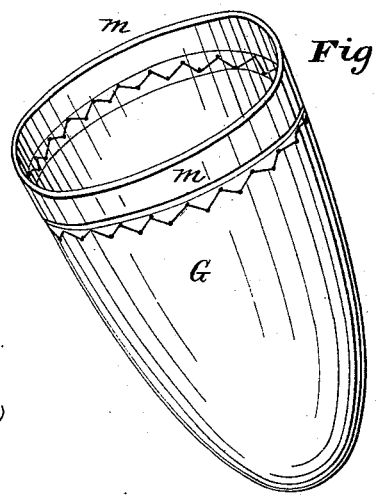

Figure 2, a perspective view of the felt filtering-pocket or bag.

A represents the body or main portion of a French coffee-pot, provided with the usual handle, B, and spout, C, the latter being provided at its mouth with a lid or valve, *d*, if deemed expedient.

E is the upper portion, or filter-compartment, which, as usual, is made to fit or rest in the open top of A, is about cylindrical in shape, and is provided with a cover, *f*, which serves also as a lid to the portion A when the portion E is removed.

G is the felt filtering-pocket or bag, which is made of a seamless piece of woollen felt, manufactured of the proper size and shape to suit the pot in which it is to be employed, and is sewed (or otherwise attached) at its upper open end, or mouth, to a metallic collar or ring, *m*, which ring is made slightly tapering, with a small flange at its upper edge, and is adapted to set down into the top of E, as shown at fig. 1.

To make coffee in my improved coffee-pot, the coffee, ground as fine as possible, (or practicable,) is placed in the pocket G, and the boiling water poured slowly (at intervals) on to it, and allowed to slowly filter through the coffee and felt pocket G, and fall into the body A of the pot. When the water shall have all filtered through, and all the essence and flavor been extracted from the coffee, the upper portion E, carrying the filter-pocket and ring *m*, may be removed, the lid *f* put on portion A, and the coffee served from the latter, in the usual manner.

It will be understood that by the use of the felt pocket G, through the pores of which the water has to percolate, the process of extracting all the aroma of the coffee can be much more successfully carried on than it can be in the metallic perforated filter, because in the latter the coffee cannot be used, ground so fine, and consequently the aroma cannot be so entirely extracted as in my improved coffee-pot, in which the coffee can be used, ground never so fine.

The pocket G being made seamless, and provided with a holder-ring, *m*, at its mouth, as shown, there is nothing to clog up, or give trouble, or get dirty, with ordinary care. All the cook need do, after having made the coffee, is to empty out the grounds, rinse out the pocket and squeeze it, or, what is better, hang it up and let it dry.

Other felt may be used, but I find the woollen felt best adapted to the purposes of the filter, because of its greater porosity, or openness of texture.

Of course my invention may be applied to large apparatus of different detail, construction, design, &c., for making coffee in large quantities, as, for instance, in hotels and restaurants, and the felt filter may be manufactured of any desired size and shape, but should always be made in one piece, as shown and described, without any seam or joint.

Having described my invention, so that those skilled in the art can make and use it,

I claim, as a new article of manufacture—

A coffee-pot, composed of a suitable receptacle and filter-support, and provided with a seamless filter of felt, substantially as and for the purpose set forth.

In testimony whereof, I have hereunto set my hand and seal, this 31st day of December, 1868.

J. L. LABIAUX. [L. S.]

Witnesses:
J. N. McINTIRE,
CHAS. A. SCOTT.